(12) United States Patent
Cutler

(10) Patent No.: US 7,397,504 B2
(45) Date of Patent: Jul. 8, 2008

(54) WHITEBOARD VIEW CAMERA

(75) Inventor: Ross Cutler, Duvall, WA (US)

(73) Assignee: Microsoft Corp., Redmond, WA (US)

( * ) Notice: Subject to any disclaimer, the term of this patent is extended or adjusted under 35 U.S.C. 154(b) by 105 days.

(21) Appl. No.: 10/602,187

(22) Filed: Jun. 24, 2003

(65) Prior Publication Data

US 2004/0263646 A1    Dec. 30, 2004

(51) Int. Cl.
*H04N 5/262* (2006.01)
*H04N 5/225* (2006.01)
*G06K 9/36* (2006.01)

(52) U.S. Cl. .................... 348/239; 348/373; 348/349; 382/284

(58) Field of Classification Search .............. 348/218.1, 348/373, 14.08, 14.01, 14.1; 382/284
See application file for complete search history.

(56) References Cited

U.S. PATENT DOCUMENTS

| | | | |
|---|---|---|---|
| 2,931,267 A | | 4/1960 | Hoch |
| 3,118,340 A | | 1/1964 | Iwerks |
| 5,335,011 A | * | 8/1994 | Addeo et al. ............... 348/14.1 |
| 5,539,483 A | | 7/1996 | Nalwa |
| 5,745,305 A | | 4/1998 | Nalwa |
| 5,793,527 A | | 8/1998 | Nalwa |
| 5,990,934 A | | 11/1999 | Nalwa |
| 6,005,611 A | | 12/1999 | Gullichesen et al. |
| 6,043,837 A | | 3/2000 | Driscoll, Jr. et al. |
| 6,111,702 A | | 8/2000 | Nalwa |
| 6,115,068 A | * | 9/2000 | Ariga et al. .................. 348/373 |
| 6,115,176 A | | 9/2000 | Nalwa |
| 6,122,865 A | * | 9/2000 | Branc et al. ................... 52/36.1 |
| 6,128,143 A | | 10/2000 | Nalwa |
| 6,141,145 A | | 10/2000 | Nalwa |
| 6,144,501 A | | 11/2000 | Nalwa |

(Continued)

FOREIGN PATENT DOCUMENTS

JP       08108689 A    *  4/1996

(Continued)

*Primary Examiner*—Ngoc-Yen T. Vu
*Assistant Examiner*—Christopher K Peterson
(74) *Attorney, Agent, or Firm*—Lyon & Harr, LLP; Katrina A. Lyon

OTHER PUBLICATIONS

U.S. Appl. No. 10/608,363, filed Jun. 26, 2003, Cutler.

(57) ABSTRACT

A whiteboard view camera, which in one embodiment is mounted on a boom, which is fixed above the whiteboard. However, the whiteboard view camera can also be wall or table mounted. The whiteboard view camera differs from an ordinary camera by allowing the lens to tilt with respect to the sensor plane, and shift with respect to the central ray. When the tilt angle α is zero, then the resolution of whiteboard is uniform (e.g., the top and bottom of the whiteboard have the same resolution). In addition, the focus plane is equal to the whiteboard plane, so depth of field issues are not a problem (e.g., a large aperture can be used). Hence, no image noise is introduced. A key contribution of the whiteboard view camera configuration according to the invention is the use of a view camera to capture whiteboard images at uniform resolutions. One embodiment of the whiteboard view camera employs a microphone array of the invention and uses a computer to optimize the image data and audio signals.

24 Claims, 5 Drawing Sheets

U.S. PATENT DOCUMENTS

| | | | |
|---|---|---|---|
| 6,175,454 | B1 | 1/2001 | Hoogland et al. |
| 6,179,426 | B1* | 1/2001 | Rodriguez et al. ............ 353/69 |
| 6,195,204 | B1 | 2/2001 | Nalwa |
| 6,219,089 | B1 | 4/2001 | Driscoll, Jr. et al. |
| 6,219,090 | B1 | 4/2001 | Nalwa |
| 6,222,683 | B1 | 4/2001 | Hoogland et al. |
| 6,226,035 | B1* | 5/2001 | Korein et al. ............... 348/335 |
| 6,285,365 | B1 | 9/2001 | Nalwa |
| 6,313,865 | B1 | 11/2001 | Driscoll, Jr. et al. |
| 6,331,869 | B1 | 12/2001 | Furlan et al. |
| 6,337,708 | B1 | 1/2002 | Furlan et al. |
| 6,341,044 | B1 | 1/2002 | Driscoll, Jr. et al. |
| 6,346,967 | B1 | 2/2002 | Gullichsen et al. |
| 6,356,296 | B1 | 3/2002 | Driscoll, Jr. et al. |
| 6,356,397 | B1 | 3/2002 | Nalwa |
| 6,369,818 | B1 | 4/2002 | Hoffman et al. |
| 6,373,642 | B1 | 4/2002 | Wallerstein et al. |
| 6,388,820 | B1 | 5/2002 | Wallerstein et al. |
| 6,392,687 | B1 | 5/2002 | Driscoll, Jr. et al. |
| 6,424,377 | B1 | 7/2002 | Driscoll, Jr. et al. |
| 6,426,774 | B1 | 7/2002 | Driscoll, Jr. et al. |
| 6,459,451 | B2 | 10/2002 | Driscoll, Jr. et al. |
| 6,466,254 | B1 | 10/2002 | Furlan et al. |
| 6,480,229 | B1 | 11/2002 | Driscoll, Jr. et al. |
| 6,493,032 | B1 | 12/2002 | Wallerstein et al. |
| 6,515,696 | B1 | 2/2003 | Driscoll, Jr. et al. |
| 6,539,547 | B2 | 3/2003 | Driscoll, Jr. et al. |
| 6,549,230 | B2* | 4/2003 | Tosaya ..................... 348/14.08 |
| 6,583,815 | B1 | 6/2003 | Driscoll, Jr. et al. |
| 6,593,969 | B1 | 7/2003 | Driscoll, Jr. et al. |
| 6,597,520 | B2 | 7/2003 | Wallerstein et al. |
| 6,671,419 | B1* | 12/2003 | Martins ...................... 382/274 |
| 6,700,711 | B2 | 3/2004 | Nalwa |
| 6,741,250 | B1 | 5/2004 | Furlan et al. |
| 6,756,990 | B2 | 6/2004 | Koller |
| 6,771,834 | B1* | 8/2004 | Martins et al. .............. 382/257 |
| 6,885,509 | B2 | 4/2005 | Wallerstein et al. |
| 6,924,832 | B1 | 8/2005 | Shiffer et al. |
| 2002/0034020 | A1 | 3/2002 | Wallerstein et al. |
| 2002/0063802 | A1 | 5/2002 | Gullichsen et al. |
| 2002/0094132 | A1 | 7/2002 | Hoffman et al. |
| 2002/0154417 | A1 | 10/2002 | Wallerstein et al. |
| 2003/0142402 | A1 | 7/2003 | Carbo, Jr. et al. |
| 2003/0193606 | A1 | 10/2003 | Driscoll, Jr. et al. |
| 2003/0193607 | A1 | 10/2003 | Driscoll, Jr. et al. |
| 2004/0008407 | A1 | 1/2004 | Wallerstein et al. |
| 2004/0008423 | A1 | 1/2004 | Driscoll, Jr. et al. |
| 2004/0021764 | A1 | 2/2004 | Driscoll, Jr. et al. |
| 2004/0021790 | A1* | 2/2004 | Iga ........................ 348/333.12 |
| 2004/0100563 | A1* | 5/2004 | Sablak et al. ............ 348/211.4 |
| 2004/0201698 | A1* | 10/2004 | Keenan et al. ......... 348/207.99 |
| 2004/0252384 | A1 | 12/2004 | Wallerstein et al. |
| 2004/0254982 | A1 | 12/2004 | Hoffman et al. |

OTHER PUBLICATIONS

Rui, Y., A. Gupta and J. J. Cadiz, Viewing meetings captured by an omni-directional camera, *CHI 2001*, vol. 3, No. 1, pp. 450-457.

Rui, Y., L. He, A. Gupta and Q. Liu, Building an intelligent camera management system, *Proc. of ACM Multimedia '01*, Ottawa.

Greiffenhagen, M., V. Ramesh, D. Comaniciu, and H. Niemann, Statistical modeling and performance characterization of a real-time dual camera surveillance system, *IEEE Conf. Comp. Vision and Pattern Recognition (CVPR'00)*, 2000, vol. 2, 335-342.

Image stabilizer system, last accessed on May 26, 2004 at http://www.canon.com/technology/detail/digi_video/shakecorrect_shift.

Kostas, D., Welcome to the page of omnidirectional vision, last accessed on May 12, 2004 at http://www.cis.upenn.edu/~kostas/omni.html.

Hicks, R. A., Catadioptric sensor designs by R. Andrews Hicks, last accessed on May 12, 2004 at http://www.cs.drexel.edu/~ahicks/design/hicks-designs.html.

Columbia University, Omnicamera: Omnidirectional video camera, last accessed on May 12, 2004 at http://www1.cs.columbia.edu/CAVE/omnicam.

Pless, R., New technologies, last accessed on May 12, 2004 at http://www.cs.wustl.edu/~pless/camera.hmtl.

Argyros, A., Robot homing based on panoramic vision, last accessed on May 12, 2004 at http://www.ics.forth.gr/~argyros/research/pan_homing.htm.

Omnidirectional vision, last accessed on May 12, 2004 at http://cmp.felk.cyut.cz/demos/OmnidirectionalVision.html.

The VAST lab: Vision and software technology laboratory, Lehigh University, last accessed on May 12, 2004 at http://www.eecs.lehigh.edu/~vast.

The Atacama Desert trek, last accessed on May 12, 2004 at http://www-2.cs.cmu.edu/afs/cs/project/Iri-13/www/atacama-trek/.

Fiala, M., Research, last accessed on May 12, 2004 at http://www.cs.ualberta.ca/~fiala.

Larson, S., Eyes from eyes: Towards a new, biologically motivated, camera technology, last accessed on May 12, 2004 at http://www.cfar.umd.edu/~larson/EyesFromEyes.html.

Srinivasan, M. V., J. S. Chahl, M. A. Garratt, A. Mitzutani, D. Soccol and G. Ewyk, Biorobotic vision laboratory, last accessed on May 12, 2004 at http://cvs.anu.edu.au/bioroboticvision.

Office of the future, last accessed on May 12, 2004 at http:///www.cs.unc.edu/Research/stc.

Taylor, C. J., VideoPlus, last accessed on May 12, 2004 at http://www.cis.upenn.edu/~cjtaylor/projects/VideoPlus/VideoPlus.html.

Stiefelhagen, R., J. Yang, A. Waibel, Modeling focus of attention for meeting indexing, *ACM Multimedia'99*, Oct. '99, Orlando, Florida, pp. 3-10.

Zheng, J. Y., and S. Tsuji, Panoramic view, last accessed on May 12, 2004 at http://www.cs.iupui.edu/~jzheng/panorama.html.

Dersch, H., Panoramas and objectmovies in PDF-documents, last accessed on May 12, 2004 at http://webuser.fh-furtwangen.de/~dersch/pdfpanorama/Readme.html.

Lacriox, S., and J. Gonzalez, Robotics in natural environments—LAAS/CNRS, last accessed on May 12, 2004 at http://www.laas.fr/~simon/eden/rover/perception/pano.php.

Ulrich, I., I. Nourbakhsh, Appearance-based place recognition for topological localization, last accessed on May 12, 2004 at http://www-2.cs.cmu.edu/~iwan/localization.htm.

Digital Photography, last accessed on May 12, 2004 at http://www.digitalphotography.org.

Robot team, last accessed on May 12, 2004 at http://w3.sys.es.osaka-u.ac.jp/projects/robot/index-e.html.

Frintrop, S., I. Stratmann, E. Rome, and V. Becanovic, Omnidirectional imaging for robotic applications, last accessed on May 12, 2004 at http://www.ais.fraunhofer.de/services/OmniVision/omni-intro.html.

Stereo Omnidirectional System, last accessed on May 12, 2004 at http://www.viewplus.co.jp/products/sos/sos_english/sos_main_english.html.

Introducing the 0-360 Panoramic Optic, last accessed on May 12, 2004 at http://www.0-360.com.

360-degree Products, last accessed on May 12, 2004 at http://www.remotereality.com/vtprod/index.html.

Be Here Corporation, last accessed on May 12, 2004 at http://www.behere.com.

Egg Solution Photo 360° Product, last accessed on May 12, 2004 at http://www.eggsolution.com/prod_photo.htm.

Circarana photographic unit, last accessed on May 12, 2004 at http://cinerama.topcities.com/circarama.htm.

* cited by examiner

WHITEBOARD VIEW CAMERA

BACKGROUND

1. Technical Field

This invention is directed toward a new whiteboard capture camera design. More specifically, this invention is directed toward a camera system and device for providing uniform resolution images of a whiteboard.

2. Background Art

Many meeting scenarios use a whiteboard extensively for brainstorming sessions, lectures, project planning meetings, patent disclosures, and so on. Note-taking and copying what is written on the board often interferes with many participants' active contribution and involvement during these meetings. As a result, some efforts have been undertaken to capture whiteboard content in some automated fashion.

Several technologies have been developed to capture whiteboard content automatically. More recent technologies attempt to capture the whiteboard content in digital form from the start, especially in image form. National Television System Committee (NTSC)-resolution video cameras are often used because of their low cost. Since these cameras usually do not have enough resolution to clearly capture what is written on a typical conference room size whiteboard, several video frames must be stitched together to create a single whiteboard image.

Images captured with a high resolution digital video camera provide contextual information such as who was writing and which topic was being discussed. Traditional whiteboard cameras have a lens parallel to the image plane with a center of projection that intersects the camera sensor's central ray. The lens axis is carefully aligned "normal" to the image sensor. That is, the lens axis is perpendicular to the image sensor. Such an alignment of lens and image sensor causes the camera to be focused on a subject plane that is parallel to the image sensor.

One problem with capturing whiteboard images using this traditional camera configuration is, however, that this lens configuration results in dramatically varying resolution for portions of the whiteboard. For instance, if the camera is pointed at the top portion of the whiteboard, the lower portion of the whiteboard will typically require a much higher image resolution in order for content written on the bottom portion of the whiteboard to be readable. The resolution can differ dramatically from the top and bottom of the whiteboard, by as much as a factor of 3 times for a typical setup. Accordingly, most whiteboard camera implementations require high-resolution image sensor cameras to ensure that the entire whiteboard image has adequate image resolution to provide legible images of the entire whiteboard.

A second problem with capturing whiteboard images using this traditional camera configuration is that the focus plane is not parallel to the whiteboard plane. To overcome this second problem, a small aperture could be used, but that reduces light on the sensor and requires higher image gain, which induces image noise.

View cameras, which have been known for years, are expressly designed to let the lens and film alignment to be adjusted outside the "normal" conditions where the lens axis is aligned normal to the film. The view camera is based on a rule that is known as the Scheimpflug Principle. In 1904, Theodor Scheimpflug, described a device for correcting for the geometric distortion in aerial photographs taken when the camera lens was not pointing straight down. By applying this correction he was able to produce accurate maps. Scheimpflug's invention was based on a similar but earlier camera-like apparatus patented by Jules Carpentier in 1901. Carpentier experimented in coordinating the tilting movements of the subject plane and film plane (equivalent to the sensor plane in a digital camera) in order to keep the image in focus. Scheimpflug built on Carpentier's observations by showing that in order to achieve perfect focus, it was necessary that the subject plane, the film plane and the lens plane intersect along one common line. The lens plane is defined as the plane surface passing through the center of the lens, perpendicular to the lens axis.

The fact that this plane passes through the Scheimpflug Line is not enough to ensure focus, however. Scheimpflug's principle alone is not always very useful. There are an infinite number of ways to adjust the focus of a camera, each way obeying the Scheimpflug Principle but still not achieving the desired focus. However, there is a second law that applies to view cameras.

The second law describes three planes that must intersect along a single line. One of these planes is the aforementioned subject plane. The second plane is one through the center of the lens but parallel to the film, called the parallel-to-film lens plane, or PTF plane. The third plane is one parallel to the usual lens plane but one focal length in front of it. The second law, standing alone, defines the amount of lens tilt necessary for any given situation. The distance from the lens to where the PTF plane and the subject plane intersect is the only factor determining how much lens tilt is needed. This second law as described above has been called "the hinge rule". The hinge rule gives the hinge line through which the plane of sharp focus will pass. For sharp focus, the hinge line must be on the subject plane. The position of the camera back, through the Scheimpflug Principle, then sets the angle at which the plane of sharp focus will pass through the hinge line. Moving the camera back and forth causes the plane upon which the camera is focused to rotate about the hinge line.

The depth of field of the view camera is also closely related to the hinge rule. As stated above, the hinge rule states that as the lens-to-film distance is adjusted through simple focusing motions of the camera back, the subject plane rotates as though it were hinged at a specific location in space. That location is determined by the amount of lens tilt (relative to the camera back) and the direction of that tilt. The line about which the subject plane pivots is the hinge line. The distance from the lens to the hinge line is controlled by the amount of tilt and the focal length of the lens. The limits of the depth of field are established by just three factors: the hyperfocal distance (H) for the focal length and aperture in use, the position of the plane of sharpest focus, and by the lens-to-hinge line distance (called J). The hyperfocal distance is the distance at which one would focus a non-view camera in order to put the far limit of depth of field at infinity. H usually corresponds to about 1500 times the physical diameter of the lens aperture. At the hinge line the depth of field is zero. One hyperfocal distance in front of the camera, the depth of field, measured vertically (parallel to the camera back) is (approximately) equal to that distance J. At other distances depth of field scales with distance. At a distance H/2, the depth of field is J/2 and so on. A minor correction factor is necessary under close-up conditions.

In a view camera, depth of field is influenced directly by the distance J, which is in turn determined by the amount of lens tilt used. More lens tilt results in less depth of field. Tilting the lens can improve overall sharpness by orienting the plane of sharpest focus to coincide with the subject. But tilting the lens also reduces the amount of depth of field on either side of that plane.

SUMMARY

The invention is directed towards a camera design and process that overcomes the aforementioned limitations in cameras that capture whiteboard images by employing a view camera lens configuration that results in uniform resolution for an entire whiteboard image. Accordingly, the invention can be implemented with lower resolution cameras at a substantial savings in cost. The camera itself can be a video camera or still camera. It captures images of the whiteboard at periodic rates (e.g., 15 frames per second (FPS)). The images captured by the whiteboard view camera can be used for meeting recording or real-time-communication.

In one embodiment of the invention, the whiteboard view camera is mounted on a boom, which is fixed above the whiteboard. However, the whiteboard view camera can also be configured in non-boom embodiments. It can be mounted directly on a wall, or table mounted.

The whiteboard view camera differs from an ordinary camera by allowing the lens to tilt with respect to the sensor plane, and shift with respect to the central ray. When the tilt angle $\alpha$ is zero, then the resolution of whiteboard is uniform (e.g., the top and bottom of the whiteboard have the same resolution). In addition, the focus plane is equal to the whiteboard plane, so depth of field issues are not a problem (e.g., a large aperture can be used). Hence, no image noise is introduced by requiring a small aperture.

A key contribution of the whiteboard view camera configuration according to the invention is the use of a view camera to capture whiteboard images at uniform resolutions. In addition, another advantage of this camera is that a much cheaper image sensor can be used to capture the whiteboard at sufficient resolution for being able to read characters written thereon (e.g., 15 DPI) than for conventional whiteboard capture cameras. For example, instead of a using a 4MP sensor, a 1MP sensor can be used instead.

One embodiment of the whiteboard view camera employs a microphone or microphone array and uses a computer to optimize the image data and audio signals. The digital image output of the camera and the audio output of the microphone array (via an analog to digital converter) may be routed into a computer. The computer may perform various functions to enhance and utilize the image and audio input. For instance, the image data can be compressed to make it more compatible for broadcast over a network (such as the Internet) or saved to a computer-readable medium. Additionally, speaker location can be used to improve video compression by allowing greater resolution for facial regions than background. In one embodiment of the invention, the computer is embedded in the camera itself.

The audio input can be also be used for various purposes. For instance, the audio can be used for sound source localization, so that the audio can be optimized for the speaker's direction at any given time. Additionally, a beam forming module can be used in the computer to improve the beam shape of the audio thereby further improving filtering of audio from a given direction. Noise reduction and automatic gain control can also be used to improve the signal to noise ratio by reducing the noise and adjusting the gain to better capture the audio signals from a speaker, as opposed to the background noise of the room. Each of these image and audio processing modules can be used alone, or in combination, or not at all.

The video and audio signals, either enhanced or not, can be broadcast to another video conferencing site or the Internet. They also can be saved to a computer-readable medium for later viewing.

By integrating the whiteboard view camera with a microphone array, the calibration between the video and audio needed is greatly simplified (a precisely manufactured camera and microphone array needs no calibration) and gathering audio and video information from a conference room with a single device is achieved.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

1.0 Exemplary Operating Environment

Figure 1:
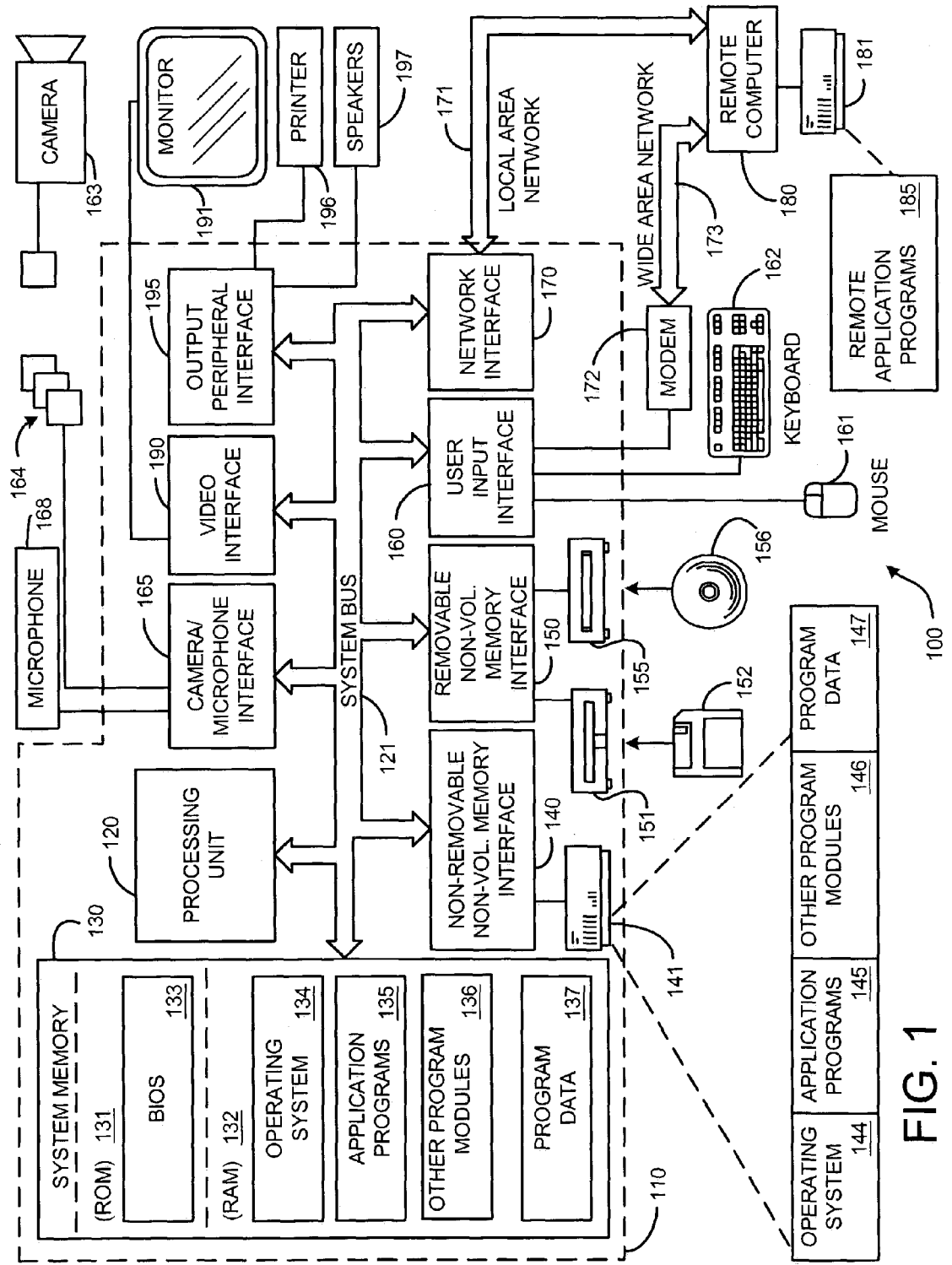
FIG. 1 is a diagram depicting a general purpose computing device constituting an exemplary system for implementing the invention.

FIG. 1 illustrates an example of a suitable computing system environment 100 on Which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. A microphone 168 may also be associated with the camera and input into the computer 110 with an interface 165 that is associated with one or more cameras. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Whiteboard View Camera.

2.1 Overview.

Figure 2:
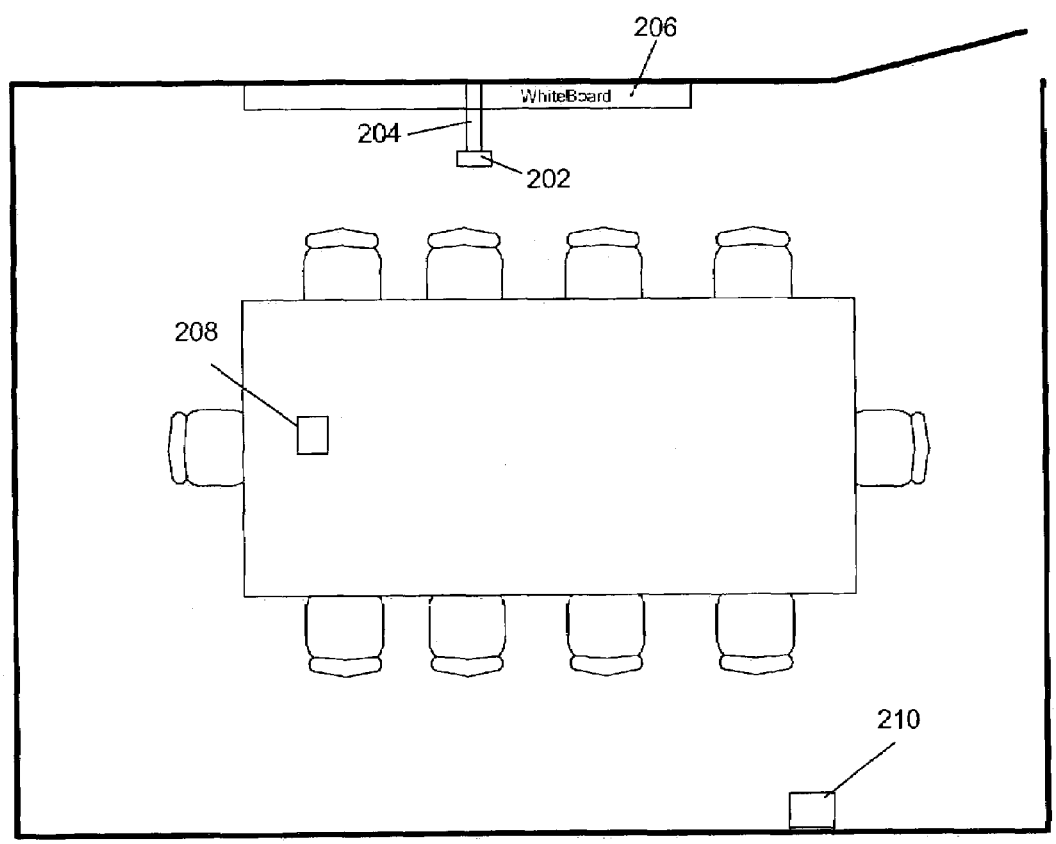
FIG. 2 is an exemplary diagram depicting the camera system according to the invention is placed in a conference room table.
Figure 3:
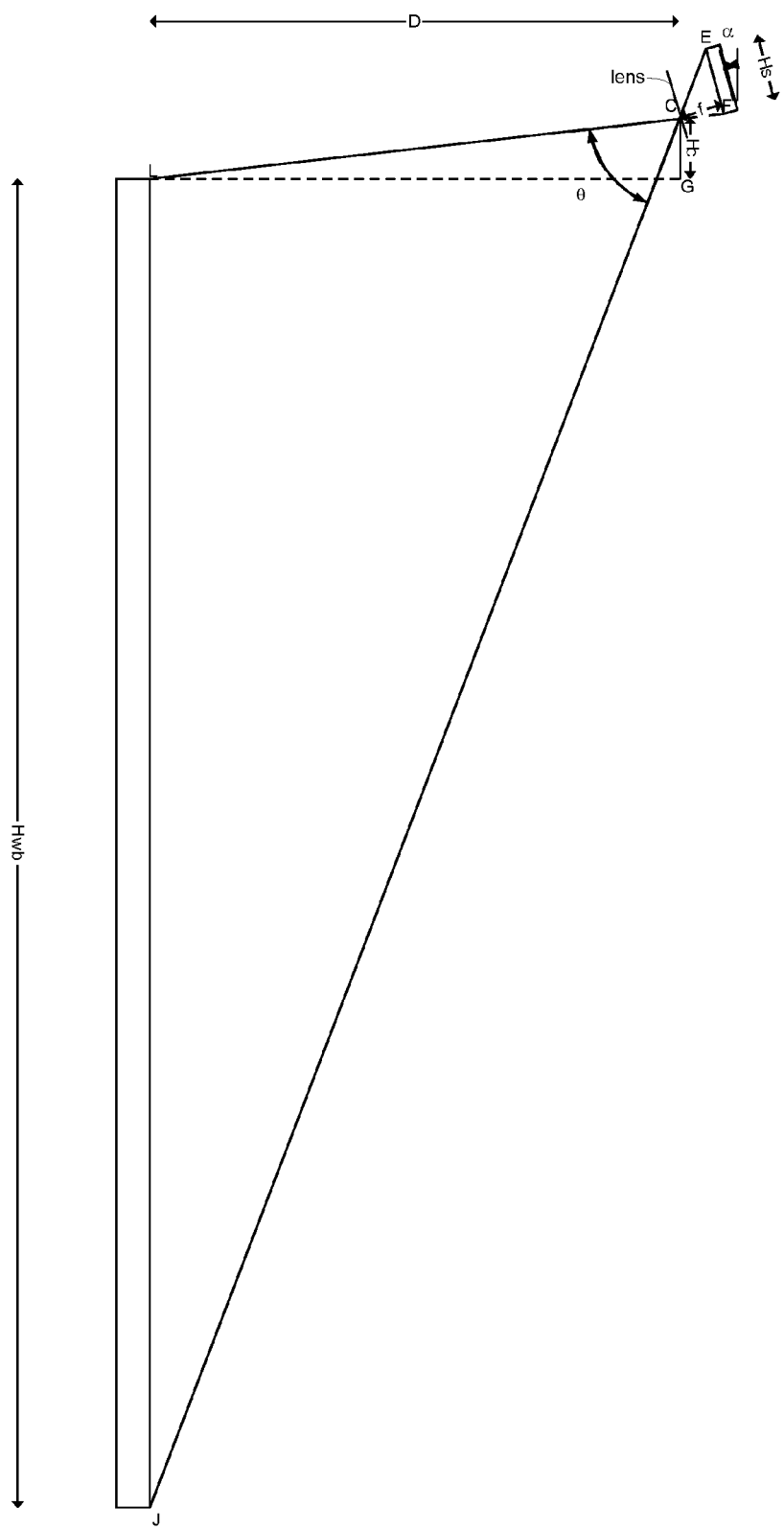
FIG. 3 depicts the geometry of a whiteboard view camera according to the invention. The center of projection is C.

The whiteboard view camera is a whiteboard capture device designed for real time communications (RTC) and meeting capture. A typical room configuration where this camera can operate is shown in FIG. 2. The whiteboard view camera can be positioned at the end of a boom 204 and configured so as to capture the whiteboard 206. Alternately, the whiteboard view camera can be table-mounted 208 or wall-mounted 210. The whiteboard view camera according to the invention differs from an ordinary camera by allowing the lens to tilt with respect to the sensor plane, and shift with respect to the central ray. When the tilt $\alpha$ is zero, and the center of projection of the lens C is positioned as shown in FIG. 3, then the resolution of whiteboard is uniform (e.g., the top and bottom of the whiteboard have the same resolution). In addition, the focus plane is equal to the whiteboard plane, so depth of field issues are not a problem (e.g., a large aperture can be used).

Figure 4:
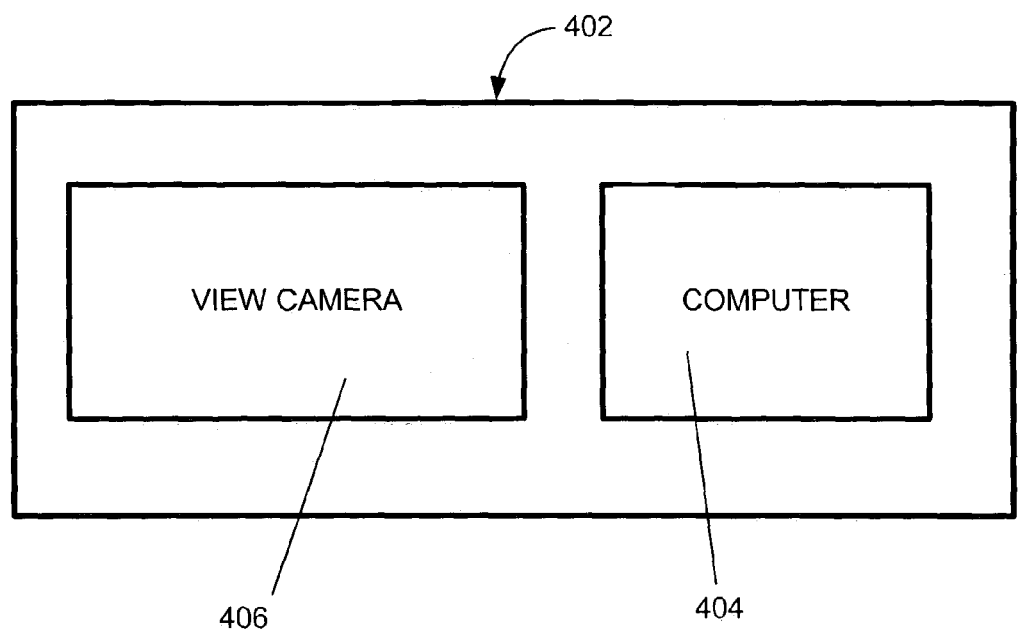
FIG. 4 is a diagram showing the components of a whiteboard view camera with an integrated computer.

One embodiment of the whiteboard view camera of the invention employs a microphone or microphone array and may use a computer to optimize the image data and audio signals. The digital image output of the camera and the audio output of the microphone device are routed into the computer. The computer may perform various functions to enhance and utilize the image and audio input. For instance, the image data can be compressed to make it more compatible for broadcast over a network (such as the Internet) or saved to a computer readable medium. Additionally, speaker location can be used to improve video compression by allowing greater resolution for facial regions than background. In one embodiment of the whiteboard view camera 402, a computer 404 is integrated with a camera 406 as shown in FIG. 4. In this embodiment a CMOS whiteboard view camera is used.

In the embodiment of the whiteboard view camera employing a microphone device, the audio input can be also be used for various purposes. For instance, the audio can be used for sound source localization, so that the audio can be optimized for the speaker's direction at any given time. Additionally, a beam forming module can be used in the computer to improve the beam shape of the audio thereby further improving filtering of audio from a given direction. A noise reduction and automatic gain control module can also be used to improve the signal to noise ratio by reducing the noise and adjusting the gain to better capture the audio signals from a speaker, as opposed to the background noise of the room. Each of these image and audio processing modules can be used alone, or in combination, or not at all. Processing for these images can be performed in the computer 404 integrated with the camera 406, or by a computer connected to the whiteboard view camera if it has no integral computer.

The primary application for the above-described camera and optional microphone device is videoconferencing and meeting recording. The video and audio signals captured by the whiteboard view camera and optional microphone device, either enhanced or not, can be broadcast to another video conferencing site or the Internet. They also can be saved to a computer readable medium for later viewing.

By integrating the microphone device with the whiteboard view camera, the calibration between the video and audio needed is greatly simplified (a precisely manufactured camera and microphone array needs no calibration) and gathering audio and video information from a conference room with a single device is achieved.

It should also be noted that there can be multiple whiteboard view cameras located at different fixed positions and adjusted such that the tilt angle relative to the whiteboard is zero that can capture a given whiteboard with a uniform resolution. This configuration is advantageous in that the whiteboard can be captured from various viewpoints for broadcast or recording and can so obtain whiteboard data even if one camera's view of the whiteboard is obstructed, such as when someone is standing in front of it.

Figure 5:
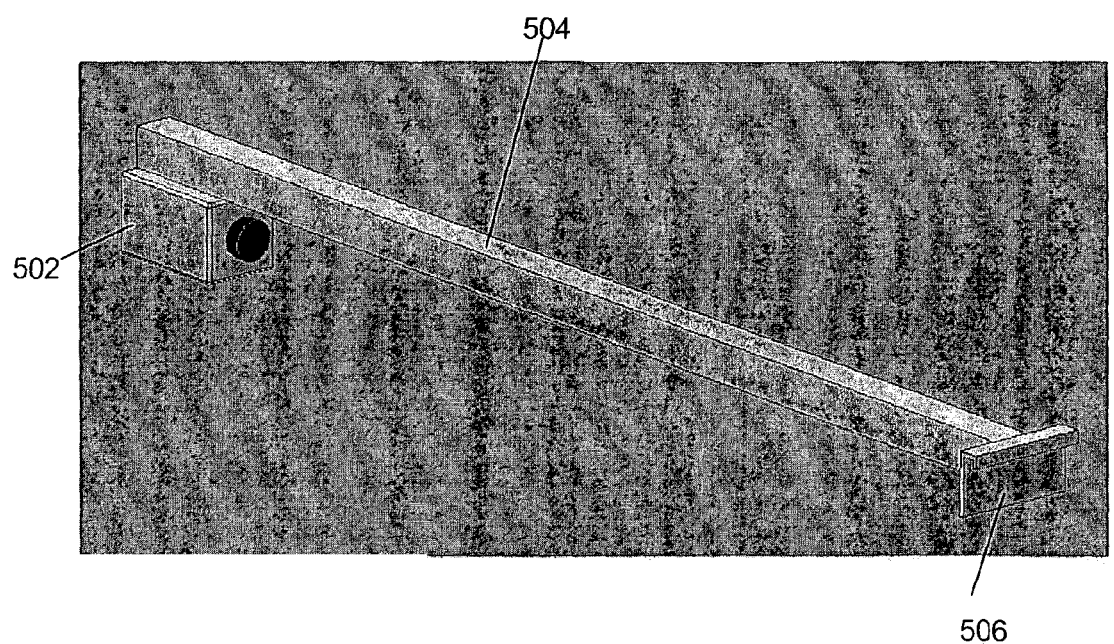
FIG. 5 is a diagram depicting one embodiment of the whiteboard view camera with a boom and snap-on mounting bracket.

One exemplary embodiment of the whiteboard view camera according to the invention is shown in FIG. 5. This embodiment consists of the following major components:

Camera head (502)
Camera boom (504)
Boom mount (506)
Cable and power supply (not shown)
Firmware/Software embedded in a computing device (not shown)
Microphone (optional and not shown)

The whiteboard view camera hardware and software components are described in more detail in the following paragraphs.

2.2 Hardware Components.

2.2.1 Camera Head.

In one exemplary embodiment of the invention, the camera head consists of a color CMOS image sensor, lens, and an embedded Personal Computer (PC) that runs an operating system, such as, for example, Microsoft® Corporation's Windows® CE. The active components are shown FIG. 5. The camera head 502 is mounted on a boom 504, which is fixed to the whiteboard or mounted on the wall just above the whiteboard. The camera uses a view camera configuration, as shown in FIG. 3. When $\alpha=0$, the captured image of the whiteboard has uniform resolution (i.e., the DPI is the same anywhere in the whiteboard). In addition, the focal plane of the view camera is parallel and coincides with the whiteboard plane. In practice, $\alpha$ can be small (a few degrees) to approximate a view camera and get near uniform resolution. The main restriction in an $\alpha=0$ configuration is that a smaller focal length lens needs to be used, which is generally more expensive. In this exemplary embodiment of the whiteboard view camera the imaging frame rate was 1 FPS or faster. The camera head clearance was 6'6" when mounted on a "typical" whiteboard of 6 feet by 4 feet. This clearance height was selected to minimize people bumping their head against the camera. However, many other whiteboard and mounting configurations could be used with the whiteboard view camera of the invention. The whiteboard should preferably be imaged completely to avoid the necessity for image stitching of images of portions of the whiteboard.

2.2.2 Camera Boom and Boom Mounts for Boom-Mounted Whiteboard View Cameras.

Although some whiteboard view cameras according to the invention do not employ a boom, in one embodiment of the invention the camera mounts to a boom that is mounted above the whiteboard as shown in FIGS. 2 and 3. In this embodiment, as shown in FIG. 5, the camera head 502 attaches to the camera boom 504, which attaches to the boom mount 506. The camera head cables are preferably routed through the boom. The boom is preferably light-weight yet strong enough to hold the camera unit and stable enough not to oscillate under minor perturbations (e.g., touching the whiteboard with a finger in a pointing gesture).

The boom length D is preferably long enough to capture the entire whiteboard. For example, referring to the exemplary whiteboard view camera configuration shown in FIG. 3, for a whiteboard width of approximately 1829 mm, and whiteboard height $H_{wb}$ of 1219 mm, the length of the boom D was approximately 1100 mm when the tilt angle $\alpha$ is 0. The values of the remaining variables are given below in Table 1 for this exemplary embodiment of the whiteboard view camera according to the invention. It should be noted, however, that the invention is certainly not limited to these parameters, but this information is only provided by way of example. The variable definitions, which correspond to the variables shown in FIG. 3, are provided in Table 2.

The boom mount of the boom can be configured in different ways to accommodate various whiteboard configurations. For example, the boom mount should preferably be able to clip onto whiteboards that mount on a rail. For non-rail whiteboards, a boom mount that screws into the wall should preferably be available. The types of mounts should be easily interchangeable to accommodate different types of whiteboard configurations.

It should be noted that since the boom can be mounted at fixed distances it is only necessary to calibrate the camera once upon mounting. Alternately, if the distance the camera is to be mounted from the whiteboard is known, the camera can be calibrated before it is mounted.

TABLE 1

Whiteboard View Camera Parameters for One Exemplary Embodiment.

| Input | | Output | |
|---|---|---|---|
| Whiteboard width (mm) | 1828.8 | CL (mm) | 1104.863 |
| | | CLG (deg) | 5.192889 |
| Whiteboard height (mm) | 1219.2 | CLJ (deg) | 95.19289 |
| | | CJL (deg) | 35.18221 |
| Hwb (mm) | 1460.843 | θ (deg) | 49.6249 |
| D (mm) | 1100.328 | CFE (deg) | 95.19289 |
| Hs (mm) | 5.32 | CEF (deg) | 35.18221 |
| Hc (mm) | 100 | CF (mm) | 4.023614 |
| α (deg) | 0 | f (mm) | 4.0071 |
| Vert resolution (pixels) | 768 | CJ (mm) | 1909.7 |
| CMOS width (mm) | 6.66 | CE (mm) | 6.954615 |
| | | Top/bottom res ratio | 1 |
| | | CMOS diagonal (mm) | 8.523966 |

The variable definitions are summarized in Table 2 below.

TABLE 2

Variable Definitions (As Exemplified in FIG. 3)

| Variable | Description |
|---|---|
| $H_{wb}$ | Height of the whiteboard imaged by the camera |
| L | Top point of the whiteboard imaged by the camera |
| J | Bottom point of the whiteboard imaged by the camera |
| D | Horizontal distance between the whiteboard and the C |
| C | Center of Projection of the camera |
| $H_s$ | Height of the image sensor |
| $H_c$ | Vertical distance between C and the top of the whiteboard |
| θ | Field of view of the camera |
| G | Point below the C and the same vertical height as L |
| f | Focal length for the camera |
| α | Tilt of the image sensor with respect to the vertical |
| F | Bottom of the image sensor |
| E | Top of image sensor |

2.2.3 Camera Settings.

In calculating the camera settings, the whiteboard width, whiteboard height, the height of the whiteboard as imaged by the camera $H_{wb}$, the horizontal distance D between the whiteboard and the center of projection (C) of the camera, the height of the image sensor $H_s$, and vertical distance between C and the top of the whiteboard $H_c$, are input. The tilt angle $\alpha$ with respect to the vertical is set to 0. A set of equations, based on conventional view camera calculations, is then used to determine the camera settings necessary to obtain uniform resolution of the whiteboard and optimum focus. That is, the field of view, θ, is calculated and utilized to determine the focal length, f, which is used to adjust the camera, thereby providing uniform resolution and optimum focus.

More specifically, the following equations outline the calculations performed. First, the location of the center of projection of the camera (C) is determined by the givens D and $H_c$.

The angle CLG, where G is a point below the center of projection (C) and the same vertical height as L, is then calculated by $$CLG = \tan^{-1}(H_c/D)$$

And similarly, the angles CLJ and CJL are calculated by $$CLJ = 90 + CLG$$

$$CJL = \tan^{-1}(D/(H_{wb} + H_c))$$

where J is a bottom point of the whiteboard imaged by the camera.

Using the angles CLJ and CJL it is possible to find the field of view of the camera θ:

$$\theta = 180 - (CLJ + CJL)$$

Similarly, the angles CFE and CEF can be calculated as $$CFE = 90 + CLG - \alpha$$

$$CEF = 180 - (CFE + \theta)$$

where $\alpha$ is the tilt angle of the image sensor with respect to the vertical, F is the bottom corner of the image sensor and E is the top corner of the image sensor. The distance between the center of projection C and the bottom corner of the image sensor F is given by $$CF = \sin(CEF) * H_s/\sin(\theta),$$

which allows for the calculation of the focal length f as $f = \sin(CFE) * CF.$

These equations can alternately be expressed as, $\theta = 90 - (\tan^{-1}(H_c/D) + \tan^{-1}(D/(H_{wb} + H_c)))$ and $f = H_s \csc(\theta) \sin(90 + \alpha - \theta - \tan^{-1}(H_c/D)) \sin(90 - \alpha + \tan^{-1}(H_c/D))$ Once the focal length and field of view are calculated, the camera focal length is set to the calculated value. In one embodiment of the invention, the focal length is automatically set.

2.2.4 Non-Boom Whiteboard View Camera Embodiments and Mounts.

The whiteboard view camera according to the invention can also be configured in non-boom embodiments. As shown in FIG. 2, one embodiment of the whiteboard view camera 210, is mounted directly on the wall. Another embodiment of the whiteboard view camera 208 is table mounted. In the non-boom mount cases, instead of moving the camera and lens in one axis, it is necessary to shift it in two axes—the width and height direction of the whiteboard using equations as discussed above. In non-boom configurations the camera should be positioned so as to have a clear view of the whiteboard.

Non-boom whiteboard view cameras can be mounted to a wall or a table with screws or suction cups.

2.2.5 Cable and Power Supply

Figure 6:
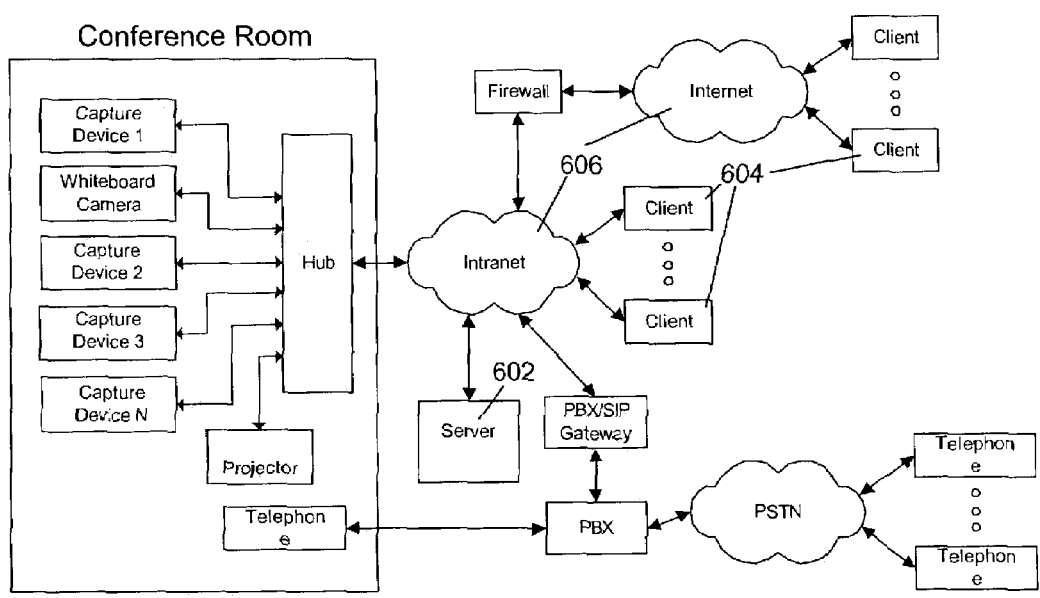
FIG. 6 depicts an exemplary whiteboard view camera system configuration in a system that is used to broadcast and record events such as a meeting.

In one embodiment of the present invention, the whiteboard view camera communicates with a system that can broadcast or record the whiteboard data (e.g., via an Ethernet cable). An exemplary system with which the whiteboard view camera can be used is shown in FIG. 6. Such a system is described in "Distributed Meetings: A Meeting Capture and Broadcasting System", *ACM Multimedia*, September 2002 by Ross Cutler, Yong Rui, Anoop Gupta, J J Cadiz, Ivan Tashev, Li-wei He, Alex Colburn, Zhengyou Zhang, Zicheng Liu, Steve Silverberg. It uses various cameras and audio and graphics capture devices and software processing to provide a rich conferencing and meeting recording experience. A meeting room server 602 performs the processing required to broadcast the meeting to one or more local or remote clients 604 via a computer or telephone network 606. The meeting room server 602 can also record the meetings.

In the embodiment of the whiteboard view camera that integrates with a system for recording and broadcasting, a single cable that comes from the camera mount should preferably split off at the end to an Ethernet cable and power transformer.

2.2.5 Microphone.

The whiteboard view camera can also be optionally integrated with a microphone or microphone array. This solution allows the whiteboard view camera system to capture the audio signal from around the meeting room, use sound source localization to find the direction of the speaker, and utilize beam-forming to enhance the sound quality recorded. The output of the integrated camera and microphone array is preferably connected to the PC, where such applications as image stitching and compression, sound source localization, beam-forming, and camera management may take place. The integrated camera and microphone array ensures a good beam shape that can be used for improving the sound quality of the speaker by filtering sound from only one direction via conventional beam forming methods. Microphone array beamforming is a technique used to "aim" the microphone array in an arbitrary direction to enhance the S/N in that direction. Any conventional method of beamforming can be used with the camera system and method according to the invention. Furthermore, the integrated nature of the camera and microphone in this embodiment is advantageous because it eliminates the need for repeated calibrations. Since the camera and microphone are integrated as a single device, only one initial calibration is necessary. Also, since the integrated camera and microphone can be of a compact, fixed design, it is much less intrusive than two separate camera and microphone components that would require separate cables and additional space.

2.3 Software/Firmware.

As mentioned previously, the whiteboard view camera can be integrated with a computer to improve whiteboard images, captured audio and allow the captured images and audio to be broadcast or recorded. The firmware or software for the integrated and preferably embedded PC in the whiteboard view camera preferably supports a protocol that allows standalone clients (e.g., notebooks in the conference room) to easily connect and capture the images taken by the camera. In one embodiment it allows for easy integration with a server that broadcasts or records the camera images (and audio if available).

In one embodiment of the whiteboard view camera, the camera can be configured via a web browser. For example, configuration parameters might include room number (e.g., 113/3379) and security codes (e.g. passwords).

The software/firmware also preferably includes the ability to perform whiteboard processing and real-time communications, as shown in FIG. 6. The whiteboard view camera provides remote clients and/or a video conferencing or meeting recording server a live video feed.

The firmware or software for the camera control preferably automatically sets camera parameters such as exposure, brightness, and contrast via conventional methods.

In addition, firmware or software can be used to perform whiteboard processing, such as creating enhanced whiteboard images (white balance, shadow removal, demosaicing), segmenting non-whiteboard objects (e.g., people), detecting stroke and key frame events. Any conventional method of performing such whiteboard enhancement processing can be used. One exemplary method of performing such whiteboard processing is described in Microsoft Corporation's Technical Report MSR-TR-2002-89 "Why Take Notes? Use the Whiteboard Capture System" by Li-wei He, Zicheng Liu and Zhengyou Zhang, in September 2002.

A codec that provides high-quality real-time video stream is preferably employed as well as a real time protocol (RTP) for network transport of data.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A camera system for capturing images of a whiteboard comprising:
    a boom positioned above a whiteboard;
    a single view camera mounted to the distal end of said boom and adjusted such that a tilt angle of a lens with respect to a sensor plane of the single view camera is zero so as to capture an in focus uniform resolution image of said entire whiteboard, wherein the in focus uniform resolution image of said entire whiteboard is captured by, inputting the parameters of the whiteboard comprising whiteboard width, whiteboard height, the height of the whiteboard as imaged by the single view camera, the horizontal distance between the whiteboard and the center of projection of the single view camera, the height of the image sensor, and vertical distance between the center of projection of the single view camera and the top of the whiteboard; and setting a tilt angle of the image sensor with the vertical axis to be approximately parallel with respect to the plane of the whiteboard;

computing the focal length of the single view camera using the input parameters of the whiteboard and the set tilt angle so as to capture an in focus, uniform resolution image of the whiteboard.

2. The camera system of claim 1 further comprising a mounting device for mounting said boom to be positioned above said whiteboard.

3. The camera system of claim 2 wherein said mounting device mounts on a rail at the top portion of said whiteboard.

4. The camera system of claim 2 wherein said mounting device mounts on a surface above the surface the whiteboard is mounted to.

5. The camera system of claim 2 wherein said system comprises more than one type of device for mounting said boom to be positioned above said whiteboard and wherein said types of devices for mounting said boom to be positioned above said whiteboard are interchangeable.

6. The camera system of claim 1 further comprising a microphone device for capturing audio synchronized with each image captured by said view camera.

7. The camera system of claim 6 wherein said microphone device is a microphone array.

8. The camera system of claim 7 wherein said audio captured by said microphone array is used for sound source localization.

9. The camera system of claim 6 wherein said microphone device is used to improve the sound quality of a speaker by filtering sound from only the direction of the speaker.

10. The camera system of claim 1 further comprising using a computer to enhance the whiteboard image.

11. The camera system of claim 10 wherein said computer enhances said whiteboard image by white-balancing the image of the whiteboard to provide an image of the whiteboard with uniform white background color.

12. The camera system of claim 10 wherein said computer enhances said whiteboard image by removing shadows on the whiteboard in the image.

13. The camera system of claim 10 wherein said computer enhances whiteboard image by segmenting non-whiteboard objects from the image of the whiteboard.

14. A process of capturing images of a whiteboard, comprising the following process actions:

positioning a single view camera above a whiteboard at the end of a boom so as to capture images of a desired portion of the whiteboard;

adjusting the single view camera such that the tilt angle of the lens with respect to the sensor plane of the camera is zero before capturing said images to provide uniform resolution in-focus images of said whiteboard, wherein adjusting the single view camera comprises, computing the focal length that will provide said uniform resolution and in-focus images of the whiteboard, wherein computing the focal length comprises:

inputting the whiteboard width, whiteboard height, the height of the whiteboard as imaged by the single view camera $H_{wb}$, the horizontal distance D between the whiteboard and the center of projection of the single view camera (C), the height of the image sensor $H_s$, and vertical distance between C and the top of the whiteboard $H_c$;

setting a tilt angle α of the image sensor with the vertical axis to be approximately parallel with respect to the plane of the whiteboard; and computing the focal length as $$f = H_s csc(\theta) sin(90+\alpha-\theta-tan^{-1}(H_c/D))$$

wherein $$\theta = 90 - (tan^{-1}(H_c/D) + tan^{-1}(D/(H_{wb}+H_c)));$$

and automatically setting the single view camera's focal length to the computed focal length.

15. The process of claim 14 further comprising the process action of sending said images to a server that broadcasts or records the images.

16. The process of claim 14 further comprising the process action of capturing audio that is synchronized with said captured images.

17. The process of claim 16 further comprising the process action of sending said images to a server that broadcasts or records the images and synchronized audio.

18. A computer-readable medium having computer-executable instructions for viewing or recording images of a whiteboard using a view camera positioned to have a view of a whiteboard and adjusted such that the tilt angle of the lens with respect to the sensor plane of the camera is zero so as to capture an in focus, uniform resolution image of the whiteboard, said computer executable instructions comprising:

inputting the parameters of the whiteboard comprising whiteboard width, whiteboard height, the height of the whiteboard as imaged by the camera, the horizontal distance between the whiteboard and the center of projection of the camera, the height of the image sensor, and vertical distance between the center of projection of the camera and the top of the whiteboard; and setting a tilt angle of the image sensor with the vertical axis to be approximately parallel with respect to the plane of the whiteboard;

computing the focal length of the camera using the input parameters of the whiteboard and the set tilt angle so as to capture an in focus, uniform resolution image of the whiteboard.

19. The computer-readable medium of claim 18 wherein inputting the parameters of the whiteboard further comprises inputting whiteboard width, whiteboard height, the height of the whiteboard as imaged by the camera $H_{wb}$, the horizontal distance D between the whiteboard and the center of projection of the camera (C), the height of the image sensor $H_s$, and vertical distance between C and the top of the whiteboard $H_c$; and wherein setting the tilt angle further comprises setting a tilt angle α of the image sensor with the vertical axis to be approximately parallel with respect to the plane of the whiteboard;

and wherein computing the focal length further comprises computing the focal length as $$f = H_s csc(\theta) sin(90+\alpha-\theta-tan^{-1}(H_c/D)) sin(90-\alpha+tan^{-1}(H_c/D))$$

wherein $\theta=90-(\tan^{-1}(H_c/D)+\tan^{-1}(D/(H_{wb}+H_c)))$.

20. A process of capturing images of a whiteboard from multiple vantage points, comprising the following process actions:

positioning more than one single view camera above a whiteboard and at a fixed distance from a whiteboard so as to view the whiteboard; and adjusting each of said single view cameras so that the tilt angle of the lens with respect to the sensor plane of the single view camera is zero in order to capture a uniform resolution, in-focus images of said entire whiteboard, wherein adjusting each of said single view cameras further comprises for each single view camera:

inputting the parameters of the whiteboard comprising whiteboard width, whiteboard height, the height of the whiteboard as imaged by the single view camera, the horizontal distance between the whiteboard and the center of projection of the single view camera, the height of the image sensor, and vertical distance between the center of projection of the single view camera and the top of the whiteboard; and setting a tilt angle of the image sensor with the vertical axis to be approximately parallel with respect to the plane of the whiteboard;

computing the focal length of the camera using the input parameters of the whiteboard and the set tilt angle so as to capture an in focus, uniform resolution image of the whiteboard.

21. The process of claim 20 further comprising the process action of:

simultaneously capturing images with each of said single view cameras; and selecting an image that provides an unobstructed view of the whiteboard from among the simultaneously captured images.

22. A camera system for capturing images of a whiteboard comprising:

a single view camera positioned on the end of a boom mounted above a whiteboard and adjusted such that the tilt angle of the lens with respect to the sensor plane of the camera is zero so as to capture an in-focus uniform resolution image of a whiteboard, wherein the in focus uniform resolution image of said entire whiteboard is captured by, inputting the parameters of the whiteboard comprising whiteboard width, whiteboard height, the height of the whiteboard as imaged by the camera, the horizontal distance between the whiteboard and the center of projection of the single view camera, the height of the image sensor, and vertical distance between the center of projection of the single view camera and the to of the whiteboard; and setting a tilt angle of the image sensor with the vertical axis to be approximately parallel with respect to the plane of the whiteboard;

computing the focal length of the single view camera using the input parameters of the whiteboard and the set tilt angle so as to capture an in focus, uniform resolution image of the whiteboard.

23. The camera system of claim 22 wherein said single view camera is mounted on a table and positioned so as to have a view of said whiteboard.

24. The camera system of claim 23 wherein said single view camera is mounted on a wall and positioned so as to have a view of said whiteboard.

* * * * *

UNITED STATES PATENT AND TRADEMARK OFFICE
CERTIFICATE OF CORRECTION

| | | |
|---|---|---|
| PATENT NO. | : 7,397,504 B2 | Page 1 of 1 |
| APPLICATION NO. | : 10/602187 | |
| DATED | : July 8, 2008 | |
| INVENTOR(S) | : Ross Cutler | |

It is certified that error appears in the above-identified patent and that said Letters Patent is hereby corrected as shown below:

In column 14, line 12, in Claim 14, after "$f=H_s csc(\theta)sin(90+\alpha-\theta-tan^{-1}(H_c/D))$" insert -- $sin(90-\alpha + tan^{-1}(H_c/D))$ --.

In column 16, line 19, in Claim 22, delete "to" and insert -- top --, therefor.

Signed and Sealed this

Twenty-sixth Day of April, 2011

David J. Kappos
*Director of the United States Patent and Trademark Office*